(12) United States Patent
Nishi et al.

(10) Patent No.: US 12,358,648 B2
(45) Date of Patent: Jul. 15, 2025

(54) CONTROL DEVICE AND ROVER EQUIPPED THEREWITH, CONTROL METHOD, AND RECORDING MEDIUM RECORDED WITH PROGRAM

(71) Applicant: TOYOTA JIDOSHA KABUSHIKI KAISHA, Toyota (JP)

(72) Inventors: Noriyuki Nishi, Toyota (JP); Hiroaki Hanzawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 18/340,939

(22) Filed: Jun. 26, 2023

(65) Prior Publication Data

US 2023/0415924 A1    Dec. 28, 2023

(30) Foreign Application Priority Data

Jun. 28, 2022    (JP) .................................. 2022-103733

(51) Int. Cl.
*B64G 1/16*    (2006.01)
*B64G 1/54*    (2006.01)

(52) U.S. Cl.
CPC ............... *B64G 1/16* (2013.01); *B64G 1/546* (2013.01)

(58) Field of Classification Search
CPC ...... B64G 1/16; B64G 1/546; G05B 23/0213; G05B 2219/24065
See application file for complete search history.

(56) References Cited

U.S. PATENT DOCUMENTS

| | | | |
|---|---|---|---|
| 10,908,104 B2* | 2/2021 | Nakayama | H01J 37/023 |
| 2006/0186342 A1* | 8/2006 | Burger | G01T 1/245 250/370.01 |
| 2013/0176870 A1* | 7/2013 | Huang | H01Q 1/246 370/252 |
| 2016/0320219 A1* | 11/2016 | Hellevang | G01F 1/74 |
| 2018/0287694 A1* | 10/2018 | Buehler | H04L 49/1507 |
| 2019/0219510 A1* | 7/2019 | Abedin | G01N 21/65 |
| 2020/0240267 A1* | 7/2020 | Sercel | B64G 99/00 |
| 2022/0263005 A1* | 8/2022 | Howe | H10N 10/13 |
| 2022/0287211 A1* | 9/2022 | Inagaki | H05K 13/0812 |
| 2023/0347174 A1* | 11/2023 | Han | A61N 5/1039 |
| 2023/0399129 A1* | 12/2023 | Nakayama | B64G 1/16 |

FOREIGN PATENT DOCUMENTS

JP    2002-366391 A    12/2002

* cited by examiner

*Primary Examiner* — Hunter B Lonsberry
*Assistant Examiner* — Jalal C Coduroglu
(74) *Attorney, Agent, or Firm* — Dickinson Wright, PLLC

(57) ABSTRACT

A control device includes a computation section that computes information related to an effect of radiation received by a rover based on error information of a processing device provided to the rover, and a control section that performs control so as to reduce the effect of radiation received by the rover based on the information related to an effect of radiation computed by the computation section.

9 Claims, 19 Drawing Sheets

FIG.7

| ECU | MOUNTING AREA | RADIATION DURABILITY |
|---|---|---|
| FIRST ECU | B | LEVEL 1 |
| SECOND ECU | B | LEVEL 4 |
| THIRD ECU | I | LEVEL 4 |
| FOURTH ECU | I | LEVEL 1 |

FIG.8

| ECU | MOUNTING AREA | RADIATION DURABILITY | INCREASE IN CORRECTION EVENT NUMBER | DETERMINATION RESULT |
|---|---|---|---|---|
| FIRST ECU | B | LEVEL 1 (WEAK) | 10 | RADIATION EFFECT: YES EFFECT LEVEL: 3 RADIATION DIRECTION: RIGHT SIDE |
| SECOND ECU | B | LEVEL 4 (STRONG) | 4 | |
| THIRD ECU | - | LEVEL 4 (STRONG) | - | - |
| FOURTH ECU | - | LEVEL 1 (WEAK) | - | - |

FIG.9

| ECU | MOUNTING AREA | RADIATION DURABILITY | INCREASE IN CORRECTION EVENT NUMBER | DETERMINATION RESULT |
|---|---|---|---|---|
| FIRST ECU | B | LEVEL 1 (WEAK) | - | RADIATION EFFECT: NO |
| SECOND ECU | B | LEVEL 4 (STRONG) | 4 | (NOT RADIATION EFFECT) |
| THIRD ECU | - | LEVEL 4 (STRONG) | - | - |
| FOURTH ECU | - | LEVEL 1 (WEAK) | - | - |

FIG.10

| ECU | MOUNTING AREA | RADIATION DURABILITY | INCREASE IN CORRECTION EVENT NUMBER | DETERMINATION RESULT |
|---|---|---|---|---|
| FIRST ECU | B | LEVEL 1 (WEAK) | 3 | RADIATION EFFECT: YES EFFECT LEVEL: 1 |
| SECOND ECU | B | LEVEL 4 (STRONG) | 1 | |
| THIRD ECU | - | LEVEL 4 (STRONG) | - | - |
| FOURTH ECU | - | LEVEL 1 (WEAK) | - | - |

FIG.11

| ECU | MOUNTING AREA | RADIATION DURABILITY | INCREASE IN CORRECTION EVENT NUMBER | DETERMINATION RESULT |
|---|---|---|---|---|
| FIRST ECU | B | LEVEL 1 (WEAK) | 7 | RADIATION EFFECT: YES EFFECT LEVEL: 2 |
| SECOND ECU | B | LEVEL 4 (STRONG) | 3 | |
| THIRD ECU | - | LEVEL 4 (STRONG) | - | - |
| FOURTH ECU | - | LEVEL 1 (WEAK) | - | - |

FIG.12

| ECU | MOUNTING AREA | RADIATION DURABILITY | INCREASE IN CORRECTION EVENT NUMBER | DETERMINATION RESULT |
|---|---|---|---|---|
| FIRST ECU | B | LEVEL 1 (WEAK) | 10 | RADIATION EFFECT: YES EFFECT LEVEL: 3 RADIATION DIRECTION: ABOVE |
| SECOND ECU | B | LEVEL 4 (STRONG) | 5 | |
| THIRD ECU | - | LEVEL 4 (STRONG) | 2 | - |
| FOURTH ECU | - | LEVEL 1 (WEAK) | 4 | - |

FIG.13

| ECU | MOUNTING AREA | RADIATION DURABILITY | INCREASE IN CORRECTION EVENT NUMBER | DETERMINATION RESULT |
|---|---|---|---|---|
| FIRST ECU | B | LEVEL 1 (WEAK) | 15 | RADIATION EFFECT: YES EFFECT LEVEL: 4 RADIATION DIRECTION: ABOVE |
| SECOND ECU | B | LEVEL 4 (STRONG) | 10 | |
| THIRD ECU | - | LEVEL 4 (STRONG) | 7 | - |
| FOURTH ECU | - | LEVEL 1 (WEAK) | 13 | - |

FIG.17

| MODE (EXAMPLES) | ROBUST SYSTEM (DUAL-SYSTEM) | NORMAL VOLTAGE /POWER | LOWER VOLTAGE / POWER | OFF OR STANDBY | SHIELDING USING EXTERNAL EQUIPMENT ROVER ORIENTATION CONTROL |
|---|---|---|---|---|---|
| NORMAL | SYSTEM (I) | YES | | | |
| | SYSTEM (II) | YES | | | |
| EFFECT LEVEL 1 | SYSTEM (I) | YES | | | |
| | SYSTEM (II) | | YES | | |
| EFFECT LEVEL 2 | SYSTEM (I) | YES | | | |
| | SYSTEM (II) | | | YES | |
| EFFECT LEVEL 3 | SYSTEM (I) | | YES | | |
| | SYSTEM (II) | | | YES | |
| EFFECT LEVEL 4 | SYSTEM (I) | | YES | | YES |
| | SYSTEM (II) | | | YES | |
| EFFECT LEVEL 5 | SYSTEM (I) | | | YES | |
| | SYSTEM (II) | | | YES | |
| EFFECT LEVEL 6 | SYSTEM (I) | | | YES | YES |
| | SYSTEM (II) | | | YES | |

CONTROL DEVICE AND ROVER EQUIPPED THEREWITH, CONTROL METHOD, AND RECORDING MEDIUM RECORDED WITH PROGRAM

This application is based on and claims priority under 35 USC 119 from Japanese Patent Application No. 2022-103733 filed on Jun. 28, 2022, the disclosure of which is incorporated by reference herein.

BACKGROUND

Technical Field

The present disclosure relates to a control device, a rover equipped therewith, a control method, and a recording medium recorded with a program.

Related Art

A CPU abnormality monitoring device for monitoring abnormalities in CPUs that perform sequence control to sequentially transition a sequence state is disclosed in Japanese Patent Application Laid-Open (JP-A) No. 2002-366391. In this CPU abnormality monitoring device, a means to determine validity of trigger data that acts as a trigger for transitioning the sequence state, and a means to determine validity of state data indicating the sequence state, are activated alternately. Abnormalities are thereby detected in instruments exposed to a cosmic radiation environment, such as astronautical instruments, in which bit flipping occurs more frequently than on earth.

JP-A No. 2002-366391 relates to technology to detect bit flipping of data due to the effect of radiation in data in a computation area of a computation register and a user area.

There is a demand to reduce the effect of radiation on electrical components in an environment greatly affected by radiation, such as in space.

SUMMARY

An object of the present disclosure is to reduce an effect of radiation received by a rover.

A first aspect is a control device including a computation section that computes information related to an effect of radiation received by a rover based on error information of a processing device provided to the rover, and a control section that performs control so as to reduce the effect of radiation received by the rover based on the information related to an effect of radiation computed by the computation section.

In the control device of the first aspect, the computation section computes the information related to the effect of radiation received by the rover based on the error information of the processing device provided to the rover. The control section performs control so as to reduce the effect of radiation received by the rover based on the information related to an effect of radiation computed by the computation section. The "error information" referred to here means information related to processing when in an abnormal state of the processing device. The control device computes the information related to the effect of radiation received by the rover based on the error information of the processing device provided to the rover, and performs control to reduce the effect of radiation received by the rover. This accordingly enables a reduction in the effect of radiation received by the rover.

A control device of a second aspect is the control device of the first aspect, wherein the computation section computes information related to an effect of radiation based on the error information and mounting position information of plural of the processing devices.

In the control device of the second aspect, the computation section computes the information related to an effect of radiation based on the error information and the mounting position information of the plural processing devices. The "mounting position information" referred to here means information indicating a position of a processing device mounted to a rover. This thereby enables the information related to an effect of radiation to be computed with good accuracy.

A control device of a third aspect is the control device of the first aspect, wherein the computation section computes the information related to an effect of radiation based on the error information and durability information expressing a durability to radiation of each of plural of the processing devices.

In the control device of the third aspect, the computation section computes the information related to an effect of radiation based on the error information and the durability information expressing the durability to radiation of each of the plural processing devices. This thereby enables the information related to an effect of radiation to be computed with good accuracy.

A control device of a fourth aspect is the control device of the first aspect, wherein the computation section computes a direction of radiation based on the error information and mounting position information of plural of the processing devices.

In the control device of the fourth aspect, the computation section computes the radiation direction based on the error information and the mounting position information of the plural processing devices. The "radiation direction" referred to here indicates from which direction the radiation received by the rover came. This thereby enables a reduction to be made in the effect of radiation received by the rover that considers the radiation direction.

The control device of the fifth aspect is the control device of the first aspect, wherein the computation section computes an extent of the effect of radiation as the information related to an effect of radiation, and the control section performs the control based on the extent of the effect of radiation.

In the control device of the fifth aspect, the computation section computes the radiation effect extent as the information related to an effect of radiation, and the control section performs the control based on the radiation effect extent. This thereby enables control to be performed according to the radiation effect extent.

The control device of a sixth aspect is the control device of the first aspect, wherein the control section performs control to change an orientation of the rover so as to reduce the effect of radiation received by the rover.

In the control device of the sixth aspect the control section performs control to change the orientation of the rover so as to reduce the effect of radiation received by the rover.

A control device of a seventh aspect is the control device of the fourth aspect, wherein the control section performs control so as to cover the rover with a shield corresponding to the direction of radiation.

In the control device of the seventh aspect, the control section performs control so as to cover the rover with the shield corresponding to the direction of radiation.

An eighth aspect is a rover including the control device of any one of the first aspect to the seventh aspect, and plural processing devices that each perform a different type of processing.

In the rover of the eighth aspect, the plural processing devices each perform a different type of processing. In the control device, the computation section computes the information related to the effect of radiation received by the rover based on the error information of the plural processing devices. The control section performs control to reduce the effect of radiation received by the rover based on the information related to an effect of radiation as computed by the computation section. The rover is thereby able to reduce the effect of radiation received by the rover.

A ninth aspect is a control method including a computation section computing information related to an effect of radiation received by a rover based on error information of a processing device provided to the rover, and a control section performs control so as to reduce the effect of radiation received by the rover based on the computed information related to an effect of radiation.

In the control method of the ninth aspect, the computation section computes information related to the effect of radiation received by the rover based on the error information of the processing device provided to the rover, and the control section performs control so as to reduce the effect of radiation received by the rover based on the computed information related to an effect of radiation. The control method is accordingly able to reduce the effect of radiation received by the rover.

A program recorded on a non-transitory recording medium of a tenth aspect is a program that causes a computer to execute processing including computing information related to an effect of radiation received by a rover based on error information of a processing device provided to the rover, and performing control so as to reduce the effect of radiation received by the rover based on the computed information related to an effect of radiation.

In the program recorded on a non-transitory recording medium of the tenth aspect, the computer computes information related to the effect of radiation received by the rover based on error information of the processing device provided to the rover. The computer also performs control so as to reduce the effect of radiation received by the rover based on the computed information related to an effect of radiation. The program is able to reduce the effect of radiation received by the rover.

The present disclosure enables a reduction in the effect of radiation received by a rover.

BRIEF DESCRIPTION OF THE DRAWINGS

Exemplary embodiments of the present disclosure will be described in detail based on the following figures, wherein:

FIG. 7 is a table illustrating an example of a mounting area and radiation durability for each ECU;

FIG. 8 is a table illustrating an example of a mounting area, a radiation durability, an increase in bit correction event number, and a determination result of information related to an effect of radiation for each ECU;

FIG. 9 is a table illustrating an example of a mounting area, a radiation durability, an increase in bit correction event number, and a determination result of information related to an effect of radiation for each ECU;

FIG. 10 is a table illustrating an example of a mounting area, a radiation durability, an increase in bit correction event number, and a determination result of information related to an effect of radiation for each ECU;

FIG. 11 is a table illustrating an example of a mounting area, a radiation durability, an increase in bit correction event number, and a determination result of information related to an effect of radiation for each ECU;

FIG. 12 is a table illustrating an example of a mounting area, a radiation durability, an increase in bit correction event number, and a determination result of information related to an effect of radiation for each ECU;

FIG. 13 is a table illustrating an example of a mounting area, a radiation durability, an increase in bit correction event number, and a determination result of information related to an effect of radiation for each ECU;

FIG. 17 is a diagram illustrating an example of control according to effect level.

DETAILED DESCRIPTION

Description follows regarding a rover according to an exemplary embodiment of the present disclosure, with reference to FIG. 1 to FIG. 18.

Figure 1:
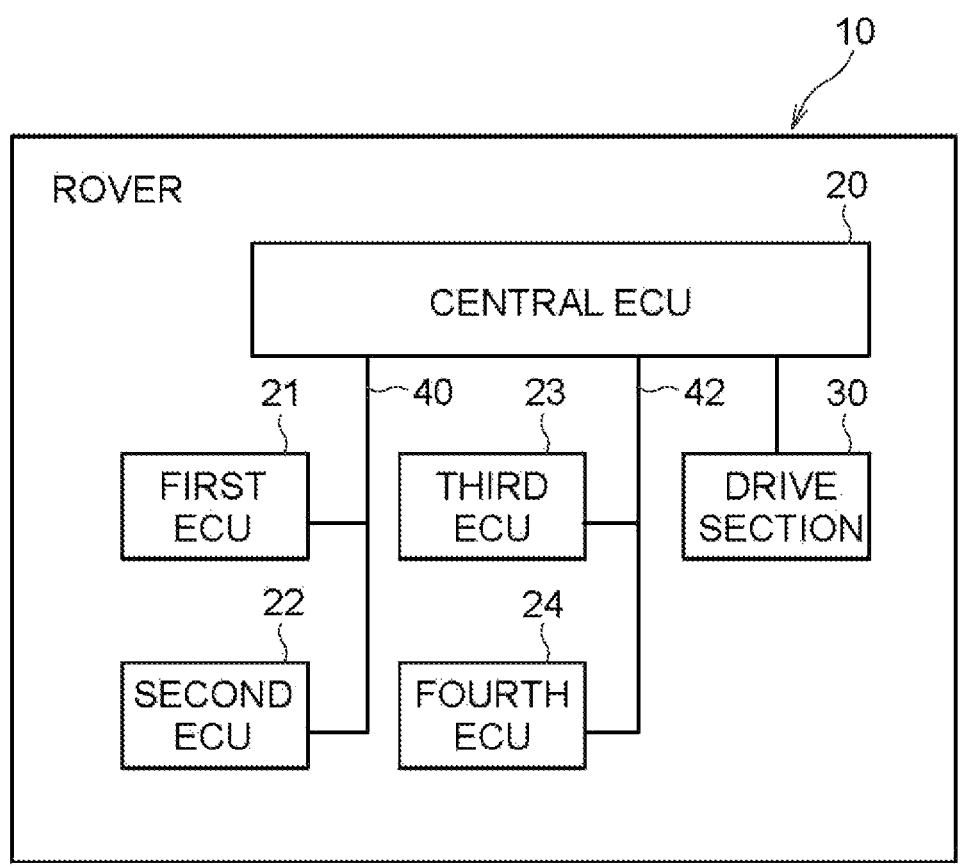
FIG. 1 is a diagram illustrating a schematic configuration of a rover according to the present exemplary embodiment.

FIG. 1 is a block diagram illustrating a schematic configuration of a rover 10 according to an exemplary embodiment of the present disclosure.

Overall Configuration

As illustrated in FIG. 1, the rover 10 according to the present exemplary embodiment includes a central ECU 20, a first ECU 21, a second ECU 22, a third ECU 23, a fourth ECU 24, and a drive section 30.

In the rover 10, the central ECU 20, the first ECU 21, and the second ECU 22 are each connected to a bus 40 using a controller area network (CAN) as a communication protocol. The central ECU 20, the third ECU 23, and the fourth ECU 24 are each connected to a bus 42. The CAN is a protocol employed, for example, to transmit information such as rover speed, engine rpm, brake state, and fault diagnosis.

Figure 2:
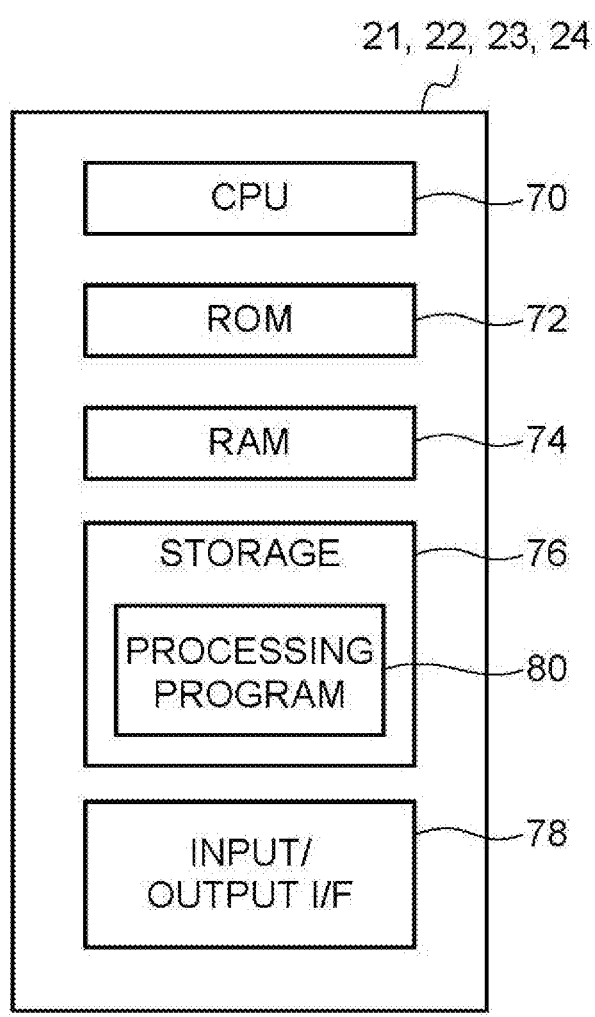
FIG. 2 is a block diagram illustrating a hardware configuration of an ECU according to the present exemplary embodiment.

As illustrated in FIG. 2, the first ECU 21, the second ECU 22, the third ECU 23, and the fourth ECU 24 have the same configuration as each other, and are each configured including a central processing unit (CPU) 70, read only memory (ROM) 72, random access memory (RAM) 74, storage 76, and an input/output I/F (interface) 78. The CPU 70, the ROM 72, the RAM 74, the storage 76, and the input/output I/F 78 are connected together through a non-illustrated internal bus so as to be capable of communicating with each other. The CPU 70 is an example of a processor, and the RAM 74 is an example of memory.

The CPU 70 is a central processing unit that executes various programs and controls respective sections. Namely, the CPU 70 reads a program from the ROM 72 or the storage 76, and executes the program using the RAM 74 as a workspace.

The ROM 72 stores various programs and various data. The RAM 74 serves as a workspace to temporarily store programs or data.

The storage 76 is stored with various programs and various data. A processing program 80 is stored in the storage 76 of the present exemplary embodiment.

The storage 76 is configured by, for example, a hard disk drive (HDD) or a solid state drive (SSD).

The input/output I/F 78 is an interface for communication with respective other ECUs. Note that the input/output I/Fs 78 of the first ECU 21 to the fourth ECU 24 employ CAN as the communication protocol.

Figure 3:
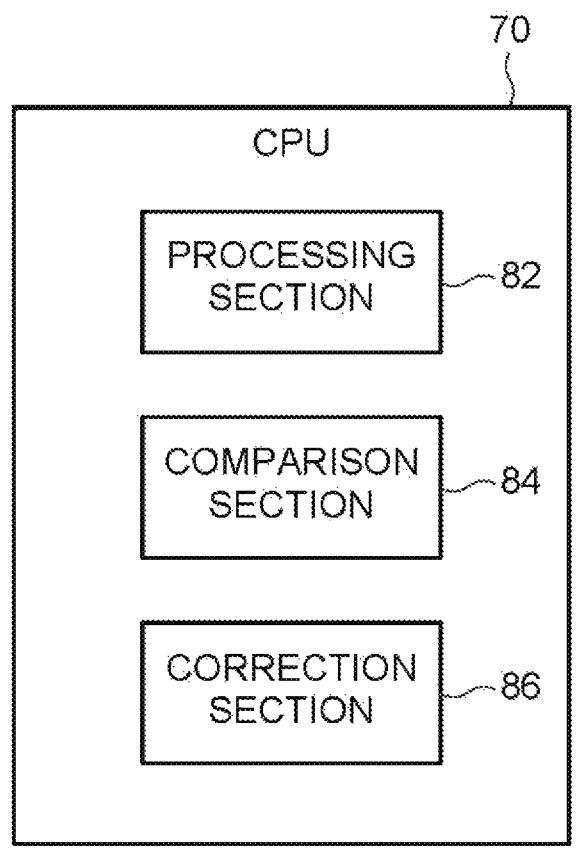
FIG. 3 is a block diagram illustrating a functional configuration of a CPU of an ECU according to the present exemplary embodiment.

As illustrated in FIG. 3, in the first ECU 21, the second ECU 22, the third ECU 23, and the fourth ECU 24 of the present exemplary embodiment, the CPUs 70 each function as a processing section 82, a comparison section 84, and a correction section 86 by executing the processing program 80.

The processing sections 82 each execute a predetermined processing (for example, engine control processing, braking processing, and processing related to a space mission).

The comparison section 84 compares data employed by the processing section 82 with comparison data, and determines whether or not these data match each other. The data employed by the processing section 82 and the comparison data no longer match each other in cases in which bit flipping has occurred in data employed by the processing section 82 due the effect of radiation and noise.

The correction section 86 performs bit correction on the data employed by the processing section 82 in cases in which the data employed by the processing section 82 does not match the comparison data as determined by the comparison section 84.

Figure 4:
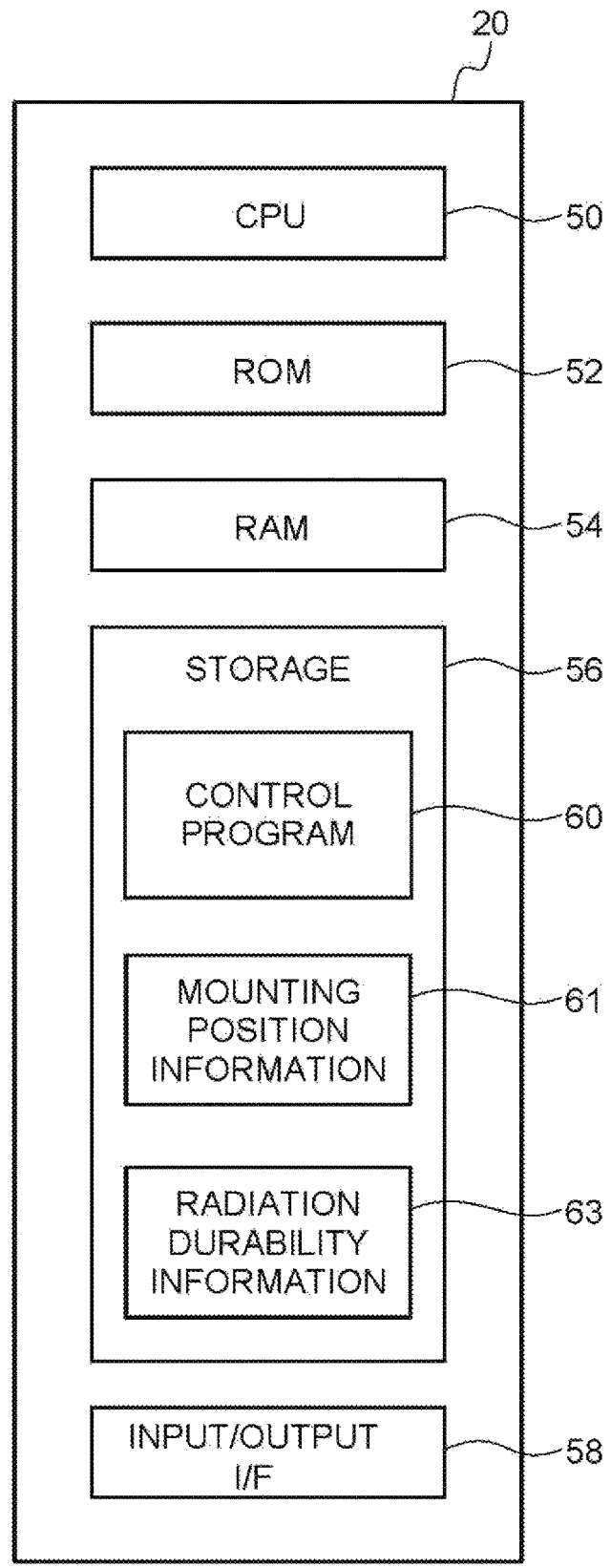
FIG. 4 is a block diagram illustrating a hardware configuration of a central ECU according to the present exemplary embodiment.

As illustrated in FIG. 4, the central ECU 20 has the same configuration as that of the first ECU 21, the second ECU 22, the third ECU 23, and the fourth ECU 24, and is configured including a CPU 50, ROM 52, RAM 54, storage 56, and an input/output I/F 58.

A control program 60, mounting position information 61, and radiation durability information 63 are stored in the storage 56.

The mounting position information 61 represents a mounting area on the rover 10 for each of the first ECU 21, the second ECU 22, the third ECU 23, and the fourth ECU 24.

The radiation durability information 63 represents a durability level with respect to radiation for each of the first ECU 21, the second ECU 22, the third ECU 23, and the fourth ECU 24.

Were onboard electronic components from earth able to be mounted to a space rover then this would increase the competitiveness to perform cost effective development, however, the radiation environment is more severe than on earth, and such mounting is not able to ignore the effects of cosmic radiation. The durability to radiation of components developed as components for use on earth is generally lower than specialized space components developed to withstand radiation, and so there is a need to reduce risk as much as possible.

In the present exemplary embodiment, in order to reduce the effect of electronic components to being irradiated with unanticipated doses of cosmic radiation, bit correction event number information from each ECU related to bit flipping generated by cosmic radiation is integrated, radiation is detected from an abnormality score, and the rate of electronic component failures from radiation is reduced by performing voltage control on the electronic components and performing control of external equipment.

Figure 5:
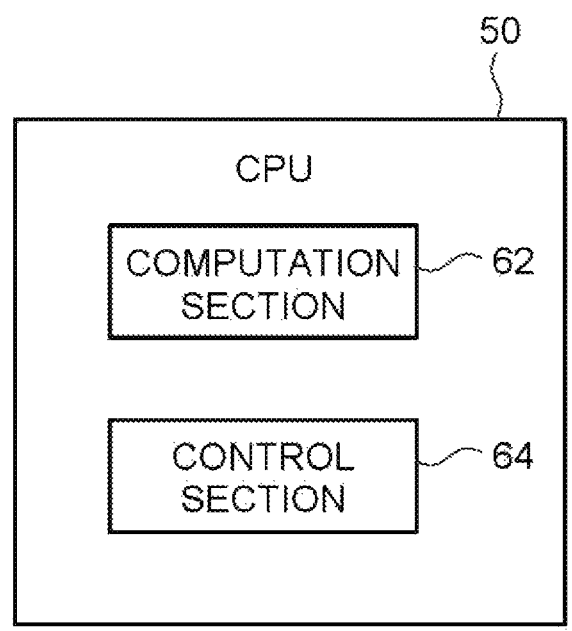
FIG. 5 is a block diagram illustrating a functional configuration of a CPU of a central ECU according to the present exemplary embodiment.

More specifically, as illustrated in FIG. 5, in the central ECU 20 of the present exemplary embodiment, the CPU 50 functions as a computation section 62 and a control section 64 by executing the control program 60.

The computation section 62 computes information related to the effect of radiation received by the rover 10 based on error information of the first ECU 21, the second ECU 22, the third ECU 23, and the fourth ECU 24 provided to the rover 10.

More specifically as the information related to an effect of radiation, the computation section 62 computes an extent of the radiation effect and also computes a radiation direction, based on a bit correction event number obtained as the error information for each of the first ECU 21, the second ECU 22, the third ECU 23, and the fourth ECU 24, and based on the mounting position information 61 and the radiation durability information 63 therefor.

More specifically, the computation section 62 determines there to be a radiation effect in cases in which there is an increase in the bit correction event number per unit time for ECUs in the same mounting area, and there is a smaller increase in the bit correction event number per unit time for ECUs of higher radiation durability.

Moreover, the computation section 62 determines the radiation direction from inter-mounting area differences to the increase in bit correction event number per unit time.

The computation section 62 also determines the radiation effect extent from a mean value of increase in bit correction event number per unit time.

Figure 6A:
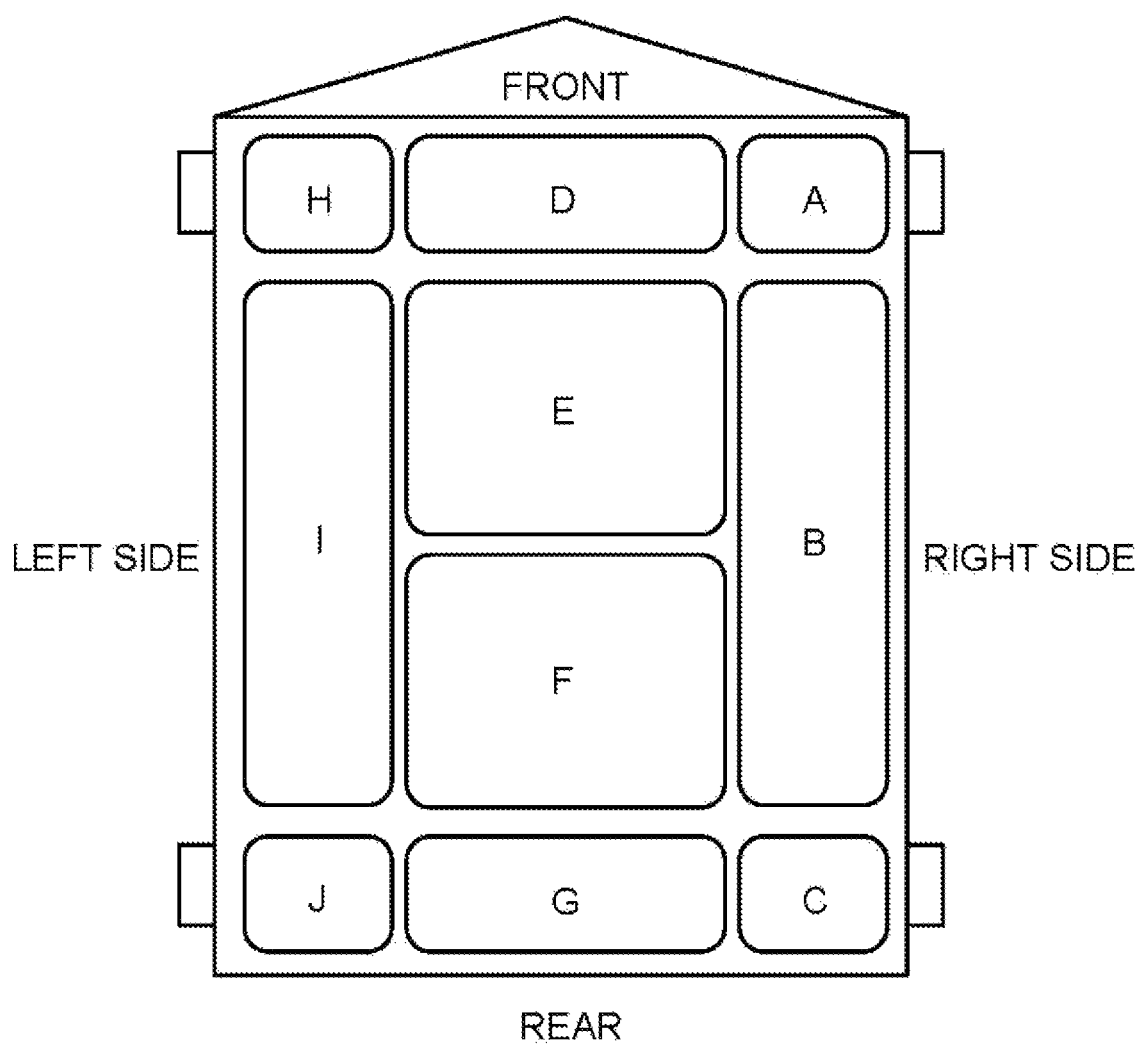
FIG. 6A is a view from above illustrating mounting areas on a rover.
Figure 6B:
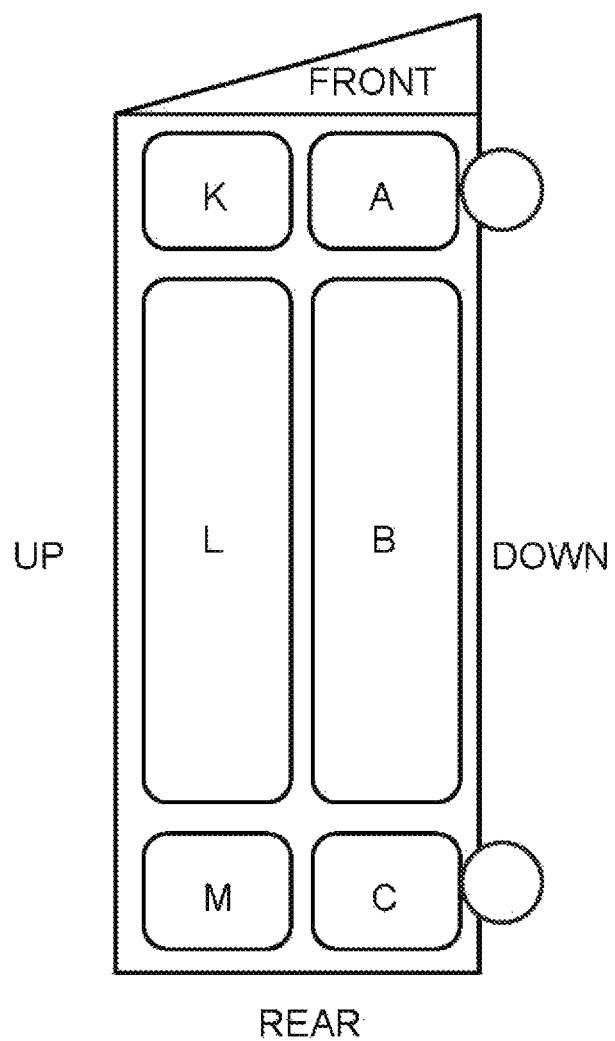
FIG. 6B is a right side view illustrating mounting areas on a rover.

For example, as illustrated in FIG. 6A, FIG. 6B, and FIG. 7, the first ECU 21 and the second ECU 22 are mounted in the area B at a lower right side position on the rover 10, and the third ECU 23 and the fourth ECU 24 are mounted in the area I at a lower left side position on the rover 10. The radiation durability for the first ECU 21 and the fourth ECU 24 is low at level 1, and the radiation durability of the second ECU 22 and the third ECU 23 is high at level 4.

As illustrated in FIG. 8, say the increase in bit correction event number per unit time is "10" for the first ECU 21, and the increase in bit correction event number per unit time is "4" for the second ECU 22. Moreover, say there is no increase in the bit correction event number per unit time for the third ECU 23 and the fourth ECU 24.

In such a situation, with regards to the mounting area B, there is an increase in bit correction event number per unit time for both the first ECU 21 and the second ECU 22, and determination is that there is a radiation effect due to the second ECU 22 of high radiation durability having a smaller increase in bit correction event number per unit time.

Moreover, a mean abnormality score, which is the product of the radiation durability level multiplied by the increase in bit correction event number per unit time, is "6.5" ($=(1\times10+4\times4+0+0)/4$), and is determined to be a radiation effect level of "3" when compared against a radiation effect level determination standard.

Although the mean abnormality score, which is the product of the radiation durability level multiplied by the increase in bit correction event number per unit time, is "13" ($=(1\times10+4\times4)/2$) for the ECUs in the mounting area B, the mean abnormality score, which is the product of the radiation durability level multiplied by the increase in bit correction event number per unit time, is "0" for the ECUs in the mounting area I, and so the radiation direction is determined to be a direction from the mounting area B side (the right side of the rover 10).

Moreover, as illustrated in FIG. 9, say the increase in bit correction event number per unit time is "4" for the second ECU 22. Moreover, say there is no increase in bit correction event number per unit time for the first ECU 21, the third ECU 23, and the fourth ECU 24.

In such a situation, in contrast to there being no increase in bit correction event number per unit time for the first ECU 21 in the mounting area B, there is an increase in bit correction event number per unit time for the second ECU 22 in the same mounting area B, and so determination is that there is no radiation effect and this increase in bit correction event number is caused by something other than a radiation effect (by noise, for example).

Moreover, as illustrated in FIG. 10, say the increase in bit correction event number per unit time is "3" for the first ECU 21 and the increase in bit correction event number per unit time is "1" for the second ECU 22. Moreover, say there is no increase in bit correction event number per unit time for the third ECU 23 and the fourth ECU 24.

In such a situation, there is an increase in bit correction event number per unit time for both the first ECU 21 and the second ECU 22 in the mounting area B, and so determination is that there is a radiation effect due to there being a smaller increase in bit correction event number per unit time for the second ECU 22 of high radiation durability.

Moreover, the mean abnormality score, which is the product of the radiation durability level multiplied by the increase in bit correction event number per unit time, is "1.75" ($=(1\times3+4\times1+0+0)/4$), and a radiation effect level of "1" is determined when compared against the radiation effect level determination standard.

As illustrated in FIG. 11, say the increase in bit correction event number per unit time is "7" for the first ECU 21, and the increase in bit correction event number per unit time is "3" for the second ECU 22. Moreover, say there is no increase in bit correction event number per unit time for the third ECU 23 and the fourth ECU 24.

In such a situation, there is an increase in bit correction event number per unit time for both the first ECU 21 and the second ECU 22 in the mounting area B, and determination is that there is a radiation effect due to there being a smaller increase in bit correction event number per unit time for the second ECU 22 of high radiation durability.

Moreover, the mean abnormality score, which is the product of the radiation durability level multiplied by the increase in bit correction event number per unit time, is "4.75" ($=(1\times7+4\times3+0+0)/4$), and a radiation effect level of "2" is determined when compared against the radiation effect level determination standard.

Moreover, as illustrated in FIG. 12, say the increase in bit correction event number per unit time is "10" for the first ECU 21, and the increase in bit correction event number per unit time is "5" for the second ECU 22. Moreover, say the increase in bit correction event number per unit time is "2" for the third ECU 23 and the increase in bit correction event number per unit time is "4" for the fourth ECU 24.

In such a situation, there is an increase in bit correction event number per unit time for both the first ECU 21 and the second ECU 22 in the mounting area B, and determination is that there is a radiation effect due to there being a smaller increase in bit correction event number per unit time for the second ECU 22 of high radiation durability.

Moreover, the mean abnormality score, which is the product of the radiation durability level multiplied by the increase in bit correction event number per unit time, is "10.5" ($=(1\times10+4\times5+4\times2+1\times4)/4$), and a radiation effect level of "3" is determined when compared against the radiation effect level determination standard.

Although the mean abnormality score, which is the product of the radiation durability level multiplied by the increase in bit correction event number per unit time, is "15" ($=(1\times10+4\times5)/2$) for the ECUs in the mounting area B, the mean abnormality score, which is the product of the radiation durability level multiplied by the increase in bit correction event number per unit time, is "6" ($=(4\times2+1\times4)/2$) for the ECUs in the mounting area I, and the radiation direction is accordingly determined to be from the mounting area B direction (from the right side of the rover 10).

Moreover as illustrated in FIG. 13, say the increase in bit correction event number per unit time is "15" for the first ECU 21, and the increase in bit correction event number per unit time is "10" for the second ECU 22. Moreover, say the increase in bit correction event number per unit time is "7" for the third ECU 23, and the increase in bit correction event number per unit time is "13" for the fourth ECU 24.

In such a situation, there is an increase in bit correction event number per unit time for both the first ECU 21 and the second ECU 22 in the mounting area B, and determination is that there is a radiation effect due to there being a smaller increase in bit correction event number per unit time for the second ECU 22 of high radiation durability.

Moreover, the mean abnormality score, which is the product of the radiation durability level multiplied by the increase in bit correction event number per unit time, is "24" ($=(1\times15+4\times10+4\times7+1\times13)/4$), and the radiation effect level is determined to be "4" when compared to the radiation effect level determination standard.

Moreover, although the mean abnormality score, which is the product of the radiation durability level multiplied by the increase in bit correction event number per unit time, is "27.5" ($=(1\times15+4\times10)/2$) for the ECUs in the mounting area B, the mean abnormality score, which is the product of the radiation durability level multiplied by the increase in bit correction event number per unit time, is "20.5" ($=(4\times7+1\times13)/2$) for the ECUs in the mounting area I, and so the radiation direction is determined to be from above of the rover 10.

The control section 64 performs control to reduce the effect of radiation received by the rover 10 based on the information related to an effect of radiation as computed by the computation section 62.

More specifically, the control section 64 performs control to lower a voltage or power of the rover 10 so as to reduce the effect of radiation received by the rover 10, performs control to switch OFF the power to the rover 10, performs control to change the orientation of the rover 10, and/or performs control so as to cover the rover 10 with a shield corresponding to the radiation direction.

More specifically, control is performed so as to lower the voltage or power supplied in the rover 10. The risk of failure occurring due to the effects of radiation is thereby reduced.

Moreover, control is performed so as to stop power being supplied in the rover 10. The risk of failure occurring due to the effects of radiation is thereby reduced.

Figure 14A:
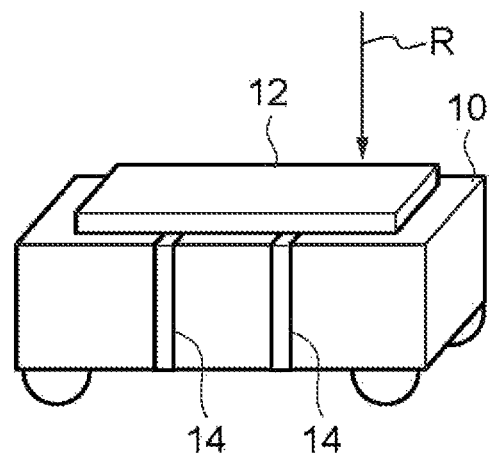
FIG. 14A is a diagram illustrating an example of an arrangement of a radiator for a case in which a radiation direction is from above.
Figure 14B:
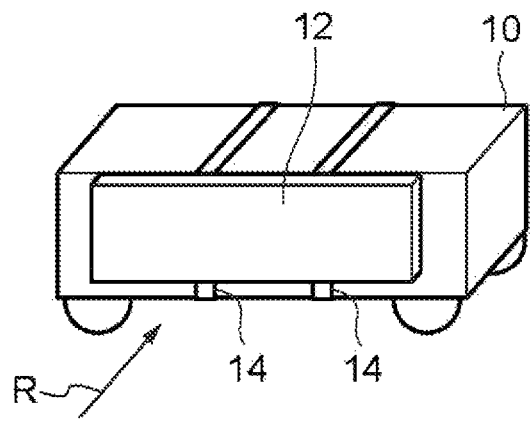
FIG. 14B is a diagram illustrating an example of an arrangement of a radiator for a case in which a radiation direction is from the side.
Figure 14C:
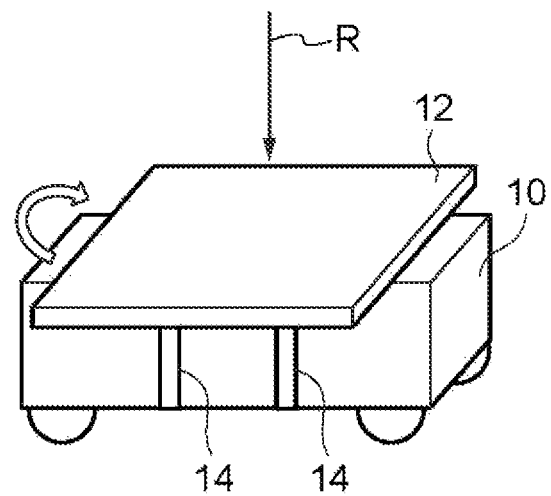
FIG. 14C is a diagram illustrating an example of an arrangement of a radiator unfurled to as to shield a rover for a case in which a radiation direction is from above.

Moreover, as illustrated in FIG. 14A to FIG. 14C, the drive section 30 is controlled so as to move a radiator 12 provided to the rover 10 along rails 14. FIG. 14A is an example of an arrangement of the radiator 12 in cases in which the radiation direction R is from above, and FIG. 14B is an example of an arrangement of the radiator 12 in cases in which the radiation direction R is from the side (right side or left side). FIG. 14C is an example of an arrangement of the radiator 12 unfurled so as to shield the rover 10 in cases in which the radiation direction R is from above.

Figure 15:
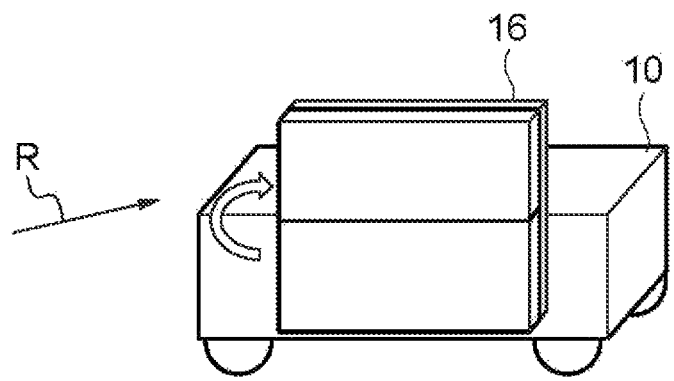
FIG. 15 is a diagram illustrating an example of an arrangement of a solar panel unfurled so as to shield a rover for a case in which a radiation direction is from the side.

As illustrated in FIG. 15, the drive section 30 is controlled so as to unfurl a solar panel 16 provided to the rover 10. FIG. 15 is an example of an arrangement of the solar panel 16 unfurled so as to shield the rover 10 in cases in which the radiation direction R is from the side.

Figure 16:
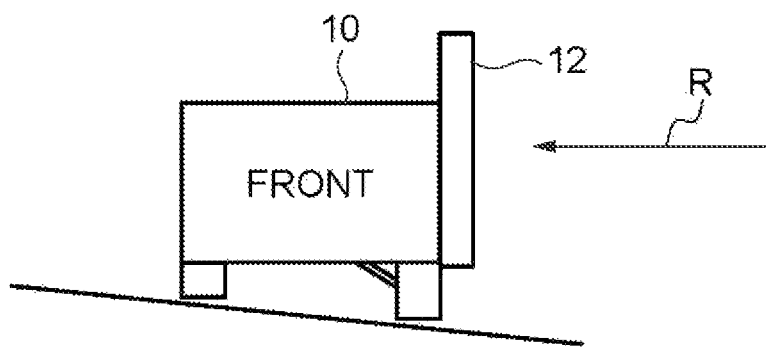
FIG. 16 is a diagram illustrating an example of an arrangement of a radiator and a horizontal orientation of a rover for a case in which the rover is positioned on an inclined surface for a radiation direction from the side.

Moreover, as illustrated in FIG. 16, the drive section 30 is controlled so as to move the radiator 12 provided to the rover 10 along the rails 14, and also suspension control is performed so as to change the orientation of the rover 10. FIG. 16 is an example in which the radiation direction R is from the side (from the left side), and is an example of using the radiator 12 to shield from radiation, by performing control to dispose the radiator 12 for cases in which the rover 10 is positioned on an inclined surface and by performing suspension control so as to obtain a horizontal orientation of the rover 10.

Moreover, the control section 64 switches control to reduce the effect of radiation received by the rover 10 based on an extent of the radiation effect.

For example, as illustrated in FIG. 17, in cases in which an overall control system including the power source of the rover 10 is a dual-system robust system and the radiation effect level is "1", control is performed such that normal power is supplied at the normal voltage by the rover 10 in one of the systems (I), and the voltage or power supplied in the rover 10 is reduced in the other system (II).

In cases in which the effect level is "2", control is performed such that normal power is supplied at normal voltage in the rover 10 in the one system (I), and either voltage or power supply is stopped in the rover 10 in the other system (II), or the motor drive of the rover 10 is stopped and put on standby.

In cases in which the effect level is "3", control is performed so as to lower the voltage or power supplied in the rover 10 in the one system (I), and control is performed so as to stop either the voltage or power supplied in the rover 10 in the other system (II), or to stop of put the motor drive of the rover 10 on standby.

In cases in which the effect level is "4", control is performed so as to lower the voltage or power supplied in the rover 10 in the one system (I), and also either control is performed to change the orientation of the rover 10, or control is performed to cover the rover 10 with a shield corresponding to the radiation direction. Control is performed so as to either stop the voltage or power being supplied in the rover 10 in the other system (II), or the motor drive of the rover 10 is stopped and put on standby.

In cases in which the effect level is "5", control is performed to either stop the voltage or power being supplied in the rover 10 in the one system (I) or the motor drive of the rover 10 is stopped and put on standby, and in the other system (II) control is performed to stop the voltage or power supplied in the rover 10.

In cases in which the effect level is "6", control is performed to either stop the voltage or power being supplied in the rover 10 in the one system (I) or the motor drive of the rover 10 is stopped and put on standby, and also either control is performed to change the orientation of the rover 10 or control is performed so as to cover the rover 10 with a shield corresponding to the radiation direction. In the other system (II), control is performed to either stop the voltage or power supplied in the rover 10 or such that the motor drive of the rover 10 is stopped and put on standby.

Flow of Processing

Figure 18:
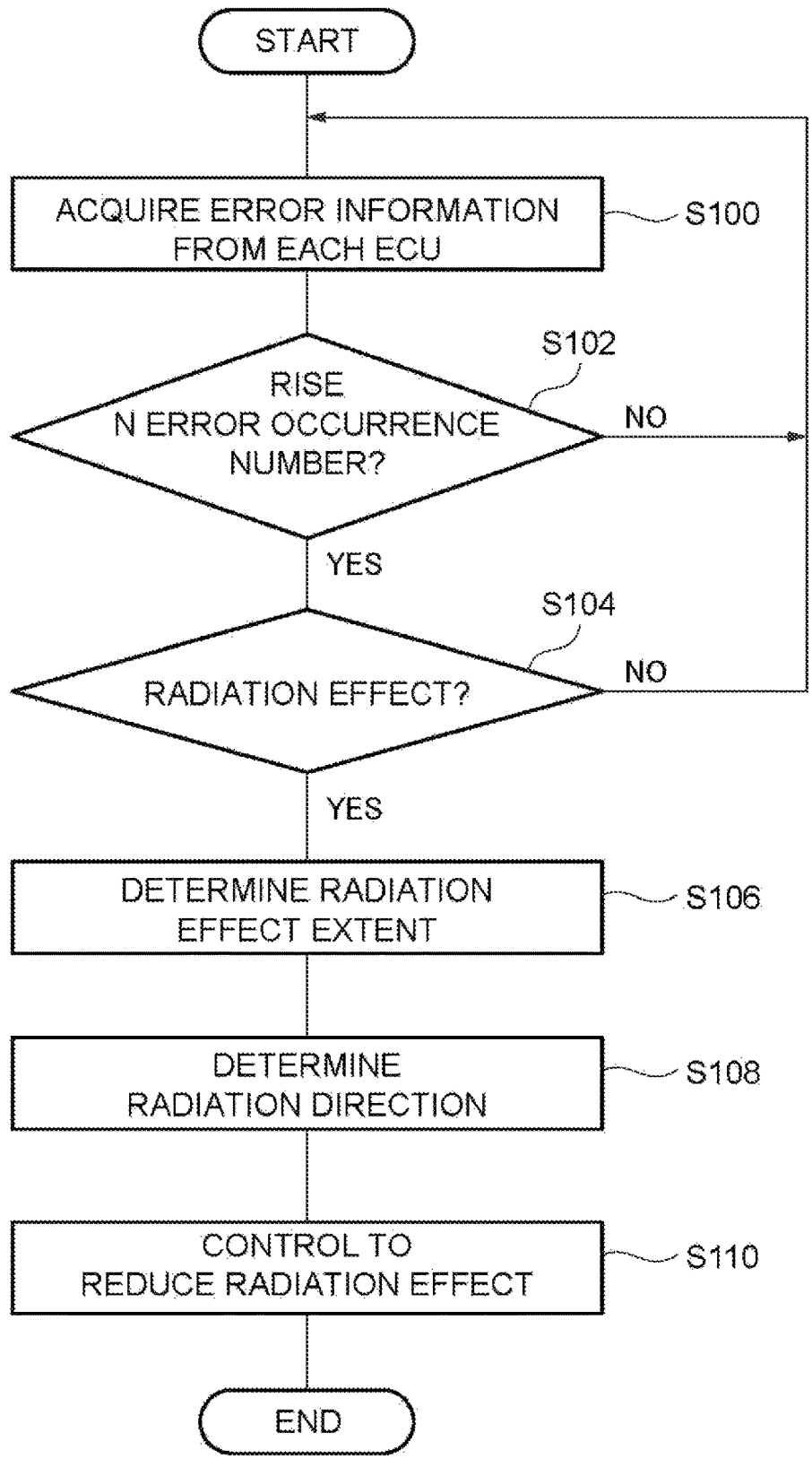
FIG. 18 is a flowchart illustrating an example of a flow of radiation reduction processing executed by a CPU of a central ECU according to the present exemplary embodiment.

Next, description follows regarding a flow of processing in the rover 10 of the present exemplary embodiment, with reference to the flowchart in FIG. 18.

First, in each of the first ECU 21, the second ECU 22, the third ECU 23, and the fourth ECU 24, the processing section 82 executes predetermined processing, and also, at a fixed cadence, the comparison section 84 compares the data employed by the processing section 82 against comparison data and determines whether or not these data match. In cases in which determination by the comparison section 84 is that the data employed by the processing section 82 does not match the comparison data, the correction section 86 performs bit correction on the data employed by the processing section 82.

When doing so, the CPU 50 of the central ECU 20 performs radiation reduction processing as illustrated in FIG. 18 by executing the control program 60.

At step S100, the CPU 50 functions as the computation section 62, and acquires an increase in bit correction event number per unit time as the error information for the first ECU 21, the second ECU 22, the third ECU 23, and the fourth ECU 24 provided in the rover 10.

At step S102, the CPU 50 functions as the computation section 62, and determines whether or not there is an increase in bit correction event number as an error occurrence number for at least one out of the first ECU 21, the second ECU 22, the third ECU 23, and the fourth ECU 24. Processing returns to step S100 in cases in which there is no increase in bit correction event number as the error occurrence number in any of the first ECU 21, the second ECU 22, the third ECU 23, and the fourth ECU 24. However, processing transitions to step S104 in cases in which there is an increase in bit correction event number as the error occurrence number in at least one out of the first ECU 21, the second ECU 22, the third ECU 23, and the fourth ECU 24.

At step S104, the CPU 50 functions as the computation section 62, and determines whether or not there is a radiation effect based on the increase in bit correction event number per unit time of the first ECU 21, the second ECU 22, the third ECU 23, and the fourth ECU 24, and based on the mounting position information 61 and the radiation durability information 63 thereof. Processing returns to step S100 in cases in which determination is that there is no effect.

However, processing transitions to step S106 in cases in which determination is that there is a radiation effect.

At step S106, the CPU 50 functions as the computation section 62, and determines the radiation effect extent based on the increase in bit correction event number per unit time of the first ECU 21, the second ECU 22, the third ECU 23, and the fourth ECU 24 and on the radiation durability information 63.

At step S108, the CPU 50 functions as the computation section 62 and determines the radiation direction based on the increase in bit correction event number per unit time of the first ECU 21, the second ECU 22, the third ECU 23, and the fourth ECU 24, and based on the mounting position information 61 and the radiation durability information 63 thereof.

At step S110, the CPU 50 functions as the control section 64 and performs control to reduce the effect of radiation received by the rover 10 based on the radiation effect extent and on the radiation direction as computed by the computation section 62, and then ends the radiation reduction processing.

Summary of Present Exemplary Embodiment

The rover 10 of the present exemplary embodiment performs control to compute the information related to the effect of radiation received by the rover based on the error information of a processing device provided in the rover, and performs control to reduce the effect of radiation received by the rover. The rover 10 accordingly enables a reduction in the effect of radiation received by the rover.

Moreover, the information related to an effect of radiation can be computed with good accuracy based on the mounting position information for each ECU and on information about the durability to radiation for each ECU.

Cases in which terrestrial components are utilized in space exploration, an increase in the failure rate is conceivable due to there being no slack given in durability to irradiation with radiation outside normal design values. The present exemplary embodiment is accordingly able to reduce the effects of radiation to the overall rover system.

Bit flipping is more liable to occur in data of a memory inside an ECU when radiation being irradiated onto the ECU is higher than anticipated. In such cases the present exemplary embodiment, in order to execute bit correction, counts the bit correction event number and computes the information related to a radiation effect. When only a single ECU is monitored, then conceivably there is a possibility that a bit flip is due to noise. The reliability of the computation result of the information related to radiation effect is accordingly raised in the present exemplary embodiment by monitoring plural ECUs.

Moreover, the failure rate is reduced by reducing the voltage in the rover as control to reduce the effect of radiation received by the rover. Moreover, the rover can be protected from radiation by moving external equipment so as to be placed in the radiation direction as control to reduce the effect of radiation received by the rover. This thereby enables the rover to be protected from radiation by using the external equipment when radiation of an unanticipated level is flying around, even when unable to hide the rover in the lee of a rock, in a basin, or the like.

Remarks

Note that although in the present exemplary embodiment an example has been described in which the bit correction event number is acquired as the error information, there is no limitation thereto. A configuration may be adopted in which information other than the bit correction event number is acquired as the error information. For example, a number of times of reset or a number of times of rebooting an ECU may be acquired as the error information.

Moreover, the error information, the mounting position information, and the radiation durability information input may be input to a trained model, such as a neural network model, and the radiation related effect level and the radiation direction computed thereby.

Moreover, although an example has been described of a case in which the central ECU mounted to the rover computes the information related to the effect of radiation received by the rover based on the error information of each ECU provided in the rover, and control is performed to reduce the effect of radiation received by the rover, there is no limitation thereto. For example, an external device of the rover may compute the information related to the effect of radiation received by the rover based on the error information of each ECU provided in the rover, and perform control to reduce the effect of radiation received by the rover. In such cases, the external devices of the rover may acquire the error information from the rover by wireless communication, compute the information related to the effect of radiation received by the rover, and transmit a command to perform control to reduce the effect of radiation received by the rover to the rover using wireless communication.

Note that the various processing executed by the CPUs reading and executing software (a program) in the above exemplary embodiments may be executed by various types of processors other than a CPU. Such processors include programmable logic devices (PLDs) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The various processing may be executed by any one of these various types of processors, or may be executed by a combination of two or more of the same type or different types of processors (such as plural FPGAs, or a combination of a CPU and an FPGA). The hardware structure of these various types of processors is more specifically an electric circuit combining circuit elements such as semiconductor elements.

Moreover, in the above exemplary embodiment an example was described in which the respective programs are in a format pre-stored (installed) on a computer-readable non-transitory recording medium. For example, the control program 60 in the rover 10 is pre-stored in the storage 56. However, there is no limitation thereto, and the respective programs may be provided in a format recorded on a non-transitory recording medium such as compact disc read only memory (CD-ROM), digital versatile disc read only memory (DVD-ROM), or universal serial bus (USB) memory. Alternatively, the respective programs may be provided in a format downloadable from an external device over a network.

The flow of processing described in the above exemplary embodiments is merely an example, and superfluous steps may be omitted, new steps may be added, or the processing sequence may be changed within a range not departing from the spirit of the present disclosure.

Moreover, the configuration of the rover described in the above exemplary embodiment is merely an example, and may be changed according to circumstances within a range not departing from the spirit of the present disclosure.

What is claimed is:

1. A control device comprising:
a memory; and
a processor coupled to the memory, wherein
the processor is configured to:
compute information related to an effect of radiation received by a rover, based on error information of a processing device provided to the rover;
perform control so as to reduce the effect of radiation received by the rover, based on the computed information related to an effect of radiation; and
compute the information related to an effect of radiation, based on the error information and mounting position information of a plurality of processing devices.

2. The control device of claim 1, wherein the processor is configured to compute the information related to an effect of radiation, based on the error information and durability information expressing a durability to radiation of each of a plurality of processing devices.

3. The control device of claim 1, wherein the processor is configured to compute a direction of radiation based on the error information and mounting position information of a plurality of processing devices.

4. The control device of claim 3, wherein the processor is configured to perform control so as to cover the rover with a shield corresponding to the direction of radiation.

5. The control device of claim 1, wherein the processor is configured to:
compute an extent of the effect of radiation as the information related to an effect of radiation; and
perform the control based on the extent of the effect of radiation.

6. The control device of claim 1, wherein the processor is configured to perform control to change an orientation of the rover so as to reduce the effect of radiation received by the rover.

7. A rover comprising:
the control device of claim 1; and
a plurality of processing devices that each perform a different type of processing.

8. A control method of processing performed by a computer, the processing comprising:
computing information related to an effect of radiation received by a rover, based on error information of a processing device provided to the rover;
performing control so as to reduce the effect of radiation received by the rover, based on the computed information related to an effect of radiation; and
computing the information related to an effect of radiation, based on the error information and mounting position information of a plurality of processing devices.

9. A non-transitory recording medium storing a program to cause a computer to execute processing, the processing comprising:
computing information related to an effect of radiation received by a rover, based on error information of a processing device provided to the rover;
performing control so as to reduce the effect of radiation received by the rover, based on the computed information related to an effect of radiation; and
computing the information related to an effect of radiation, based on the error information and mounting position information of a plurality of processing devices.

* * * * *